United States Patent [19]
Petters et al.

[11] Patent Number: 5,267,896
[45] Date of Patent: Dec. 7, 1993

[54] HEATER AND/OR AIR CONDITIONER WITH AIR-SIDE TEMPERATURE ADJUSTMENT FOR A MOTOR VEHICLE

[75] Inventors: Siegfried Petters, Weitramsdorf; Horst Riehl, Rodach, both of Fed. Rep. of Germany

[73] Assignee: Siemens Aktiengesellschaft, Munich, Fed. Rep. of Germany

[21] Appl. No.: 916,288

[22] Filed: Jul. 17, 1992

[30] Foreign Application Priority Data

Jul. 17, 1991 [EP] European Pat. Off. ......... 91111955.0

[51] Int. Cl.⁵ .............................................. B60H 1/02
[52] U.S. Cl. ...................................... 454/126; 165/42; 454/161
[58] Field of Search ..................... 165/42, 43; 454/121, 454/126, 156, 159, 160, 161

[56] References Cited

U.S. PATENT DOCUMENTS 2,277,089  3/1942  Ewald .
2,334,915  11/1943 Findley .

FOREIGN PATENT DOCUMENTS 3738425  5/1989  Fed. Rep. of Germany ........ 165/42
3924317  1/1991  Fed. Rep. of Germany .
0518122  2/1940  United Kingdom .

Primary Examiner—Harold Joyce
Attorney, Agent, or Firm—Kenyon & Kenyon

[57] ABSTRACT

A heater and/or air conditioner with air-side temperature adjustment includes adjustment with an air-mix flap in front of a mixing chamber, which with a simple and compact construction, guarantees a clear separation between intake-side fresh-air conduction, on the one hand, and warm air conduction, on the other hand, and exhibits only a small air-side contact resistance. A ring-shaped heat exchanger which is closed upon itself, is provided with a ring-shaped surrounding warm-air-duct disk and an axially upstream, ring-shaped surrounding cold-air-duct disk in each case on the outlet side with a crossover branching off into a shared mixing chamber controllable by an air-mix flap with a connected floor air duct or defrost air duct.

12 Claims, 3 Drawing Sheets

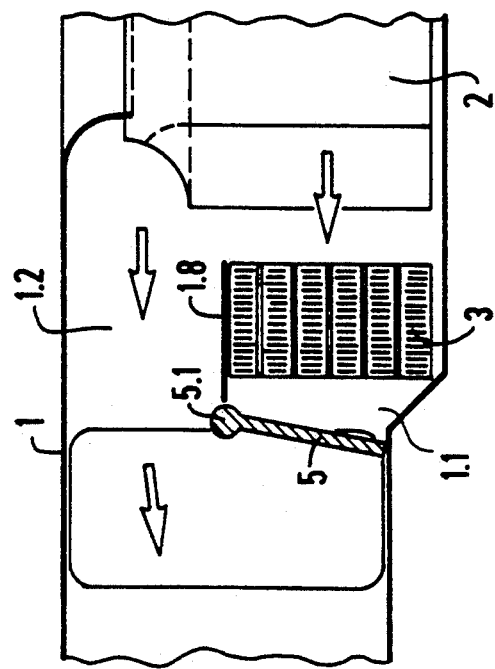
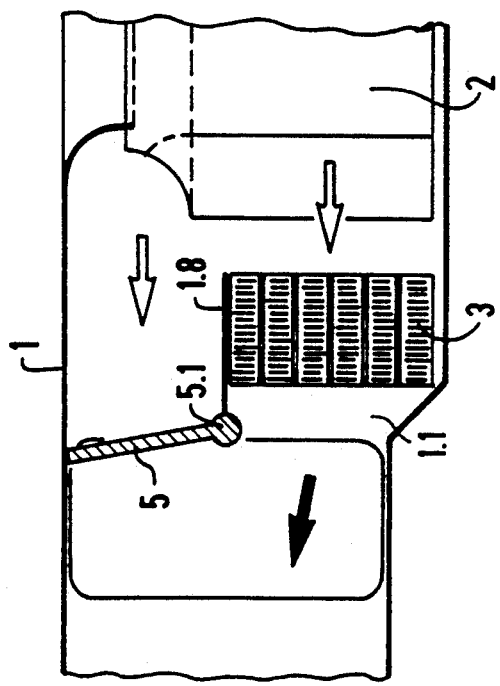

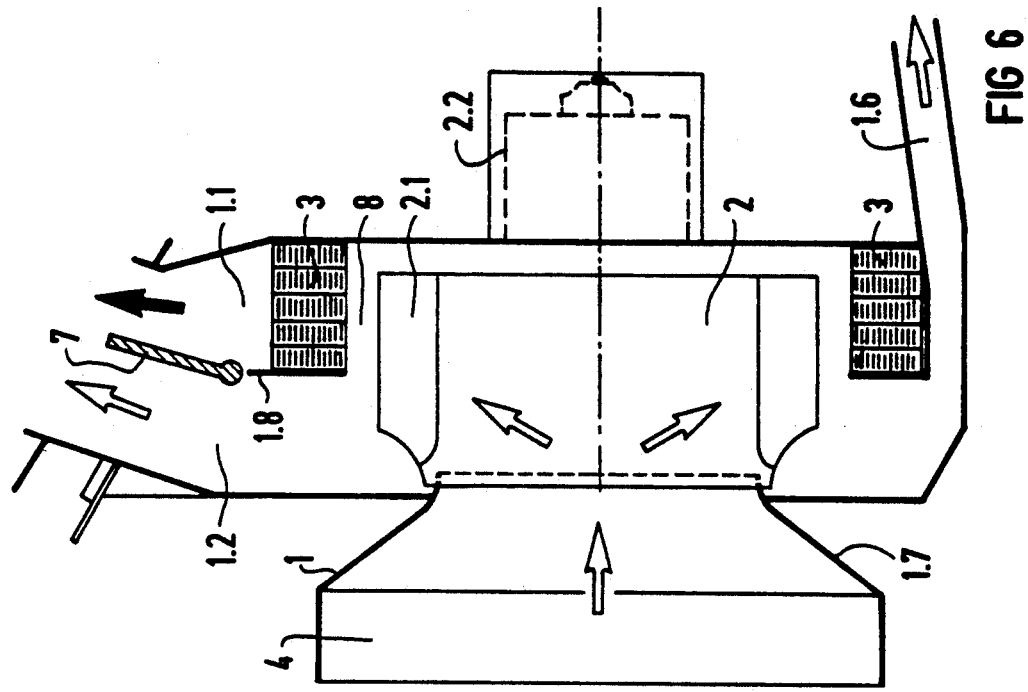
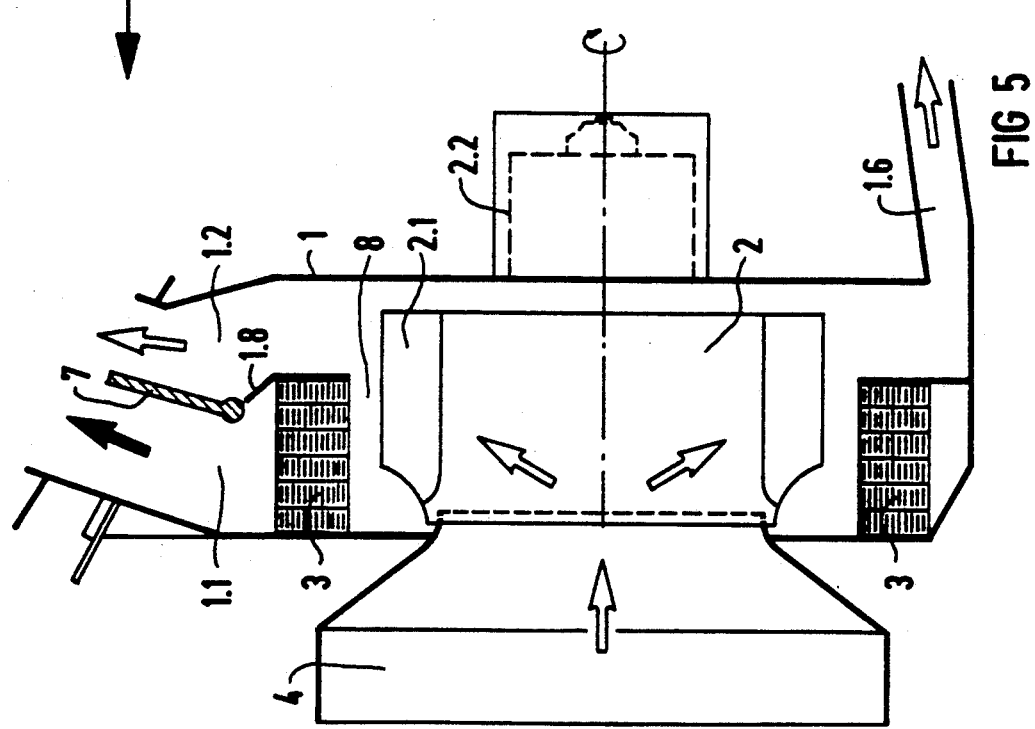

HEATER AND/OR AIR CONDITIONER WITH AIR-SIDE TEMPERATURE ADJUSTMENT FOR A MOTOR VEHICLE

BACKGROUND OF THE INVENTION

The present invention relates to a heater and/or an air conditioner with air-side temperature adjustment for a motor vehicle and in particular, a motor vehicle air-side temperature adjustment having an air flow emerging from a mixing chamber at least into one floor air duct and into one defrost air duct with a "blow-out" air temperature which can be varied by adjusting at least one air-mix flap. A warm-air duct directed through a heat exchanger and a fresh-air or recirculating-air duct separated from the heat exchanger discharge on the intake side are connected to the mixing chamber. A conventional type heater and/or air conditioner is disclosed in EP-A1-0 419 707.

In a known heater and/or air conditioner with air-side temperature adjustment means, the air is provided as either fresh air or as circulating air by a blower fan either directly or via a flat heat exchanger into a mixing chamber. The outlet side of the mixing chamber is connected to at least one floor air duct and one defrost air duct. An air-mix flap pivoted in the mixing chamber can be tilted to intermediate positions between a position completely prohibiting fresh air from being admitted on the one hand, and a position completely prohibiting warm air from being admitted on the other hand, such that either fresh air or recirculating air which is completely unaffected by the heat exchanger, or air tempered by the admixture of a larger or smaller air component delivered via the heat exchanger, may be supplied to the air ducts connected to the outlet of the mixing chamber with a correspondingly higher "blow-out" air temperature. By dividing the mixing chamber into two adjacent halves, each with its own air-mix flap, a separate left-side or right-side temperature adjustment was achieved. The air ducts connected to the outlet side of this type of mixing chamber can only lead, possibly via multiple bends, to the discharge nozzles in the floor area, near the windshield, or to the side windows. The bends in the air duct result in a relatively high air-side contact resistance.

DE-C2-39 24 317 discloses a heater and/or air conditioner for motor vehicles with water-side temperature adjustment having a heat exchanger practically bent in a U-shape to such an extent that fresh air or recirculating air discharged by a blower fan arranged centrally inside the heat exchanger is delivered radially through the heat exchanger into floor and defrost air ducts for the right or left side of the vehicle. The blown air can also be discharged through the open area remaining between the sides of the U-shaped heat exchanger to a fresh-air chamber preferably connected to nozzles of the median plane of the motor vehicle (e.g., located at the center of the dashboard). One refinement provides additional connecting ducts situated in the vicinity of the upper side of the U-shaped heat exchanger able to be closed by single flaps so that air may be run from the warm-air side to the fresh-air chamber to temper the cold air in the median plane.

U.S. Pat. No. 2,334,915 discloses a seat heater, in which an axial fan wheel, arranged inside a partial-ring-shaped heat exchanger, delivers fresh air and recirculating air, respectively, depending on the position of an arrangement of several intake-side flaps, in a variable mixture ratio via the heat exchanger to the ambient space.

The object of the present invention is to provide a heater and/or air conditioner controlled on the air side which, with a compact and simple construction, prevents the fresh-air chambers from being undesirably tempered by the heat exchanger and which permits the air-side contact resistance to be decreased, particularly with a separate left-side or right-side temperature adjustment.

SUMMARY OF THE INVENTION

The present invention achieves the above objective with a heater and/or air conditioner of the type mentioned at the outset having a first air duct, a radial air blower, a ring shaped heat exchanger, a ring shaped surrounding warm-air-duct disk, a ring shaped surrounding cold-air-duct disk, a floor air duct, a defrost air duct, and a mixing chamber. The radial air blower includes a blade ring which draws air in from the first air duct and which has an outer radius. The ring shaped heat exchanger is closed upon itself, has a common axis with the radial air blower, and has an inner radius larger than the outer radius of the radial air blower. The ring shaped surrounding warm-air-duct disk has an inlet disposed adjacent to the ring shaped heat exchanger such that some of the air drawn in by the radial air blower is directed through the ring shaped heat exchanger before entering the ring shaped surrounding warm-air-duct disk. The ring shaped surrounding cold-air-duct disk accepts some of the air drawn in by said radial air blower. The mixing chamber includes an air mix flap. It accepts air from the ring shaped surrounding warm-air-duct disk and the ring shaped cold-air-duct disk in amounts based on a position of the air mix flap. Furthermore, it is shared between the floor air duct and the defrost air duct so that air from the mixing chamber is provided to the floor air duct and the defrost air duct such that the temperature of the air emerging from the floor air duct and defrost air duct is based on the position of said air mix flap. Further a left, right, and median arrangement of mixing chambers and their associated components about the circumference of the ring shaped heat exchanger is possible. A wall may separate the warm-air-duct disk from the cold-air-duct disk. Further, an annular gap may exists between the outer radius of the blade ring and the inner radius of the ring shaped heat exchanger such that some of the air drawn in from the first air duct flows from the annular gap into the ring shaped cold-air-duct disk. Otherwise the blade ring may extend axially into the are of the cold-air-duct disk so that air is blown directly into the cold-air-duct disk.

The full-ring shape of the heat exchanger (which is thus effective over the entire circumference) achieves the same tempering action as an open U-shaped heat exchanger and does so with a smaller size. The disk-shaped, axial series arrangement of a likewise ring-shaped warm-air duct, on the one hand, and of a cold-air duct, on the other hand, permits the mixing chamber to be arranged without any undesirable tempering of the fresh-air chamber. The axial arrangement of the ring shaped warm air duct and cold air duct further permits the shortest and straightest possible outlet-side air ducts to the individual outlet nozzles (e.g., in the floor area, in the window area or in the median-plane area). Therefore, the multiple bends of the air ducts and the relatively high air-side contact resistance of the above mentioned device are avoided.

According to a first refinement of the present invention, for a heater and/or air conditioner with one left-side and one right-side floor air duct and defrost air duct each, a first mixing chamber, (e.g., for the left-side temperature adjustment) and an oppositely situated second mixing chamber (e.g., for a right-side temperature adjustment) are arranged such that a median-plane mixing chamber with a median-plane air-mix flap, arranged more or less in the center of the circumference of the ring shaped heat exchanger, can discharge between the two above-mentioned mixing chambers into the cold-air-duct disk (or into the warm-air-duct disk). As a result, separate warm-air supplemental ducts to the median-plane mixing chamber are not needed for tempering the median plane as was the case with above mentioned devices.

BRIEF DESCRIPTION OF THE DRAWINGS

The present invention, as well as further advantageous refinements of the present invention, will be clarified in greater detail based on the schematically depicted exemplified embodiments in the drawings.

FIG. 3 is a partial cut-away portion from FIG. 2 illustrating an air-mix flap position purely for warm-air operation.

FIG. 4 is a partial cut-away portion from FIG. 2 illustrating an air-mix flap position purely for cold-air operation.

FIG. 5 is a partial section of the unit according to FIG. 1 in the sectional profile V—V illustrating an arrangement of the cold-air-duct disk in the direction of travel axially in front of the heat exchanger; and FIG. 6 illustrates an arrangement of the cold-air-duct disk in the direction of travel axially behind the heat exchanger.

DETAILED DESCRIPTION

Figure 1:
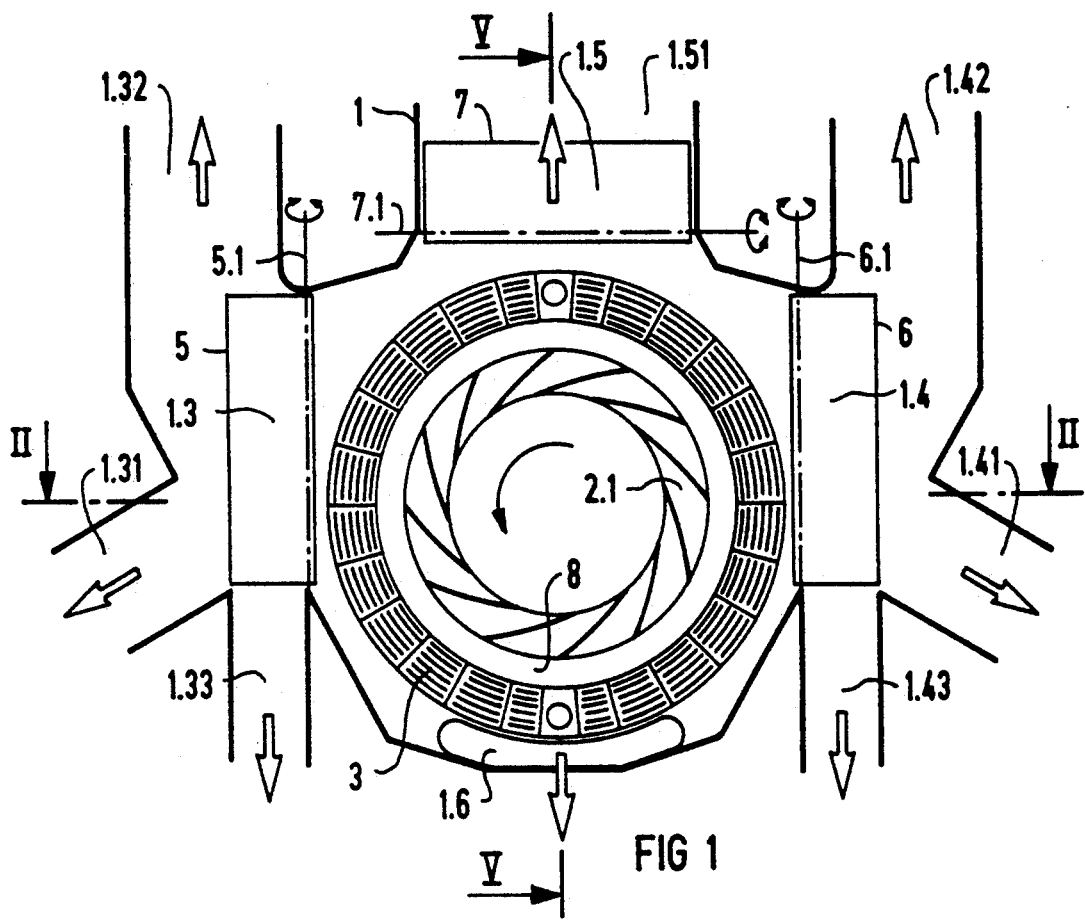
FIG. 1 is a radial sectional view of the heater and/or air conditioner according to an embodiment of the present invention.
Figure 2:
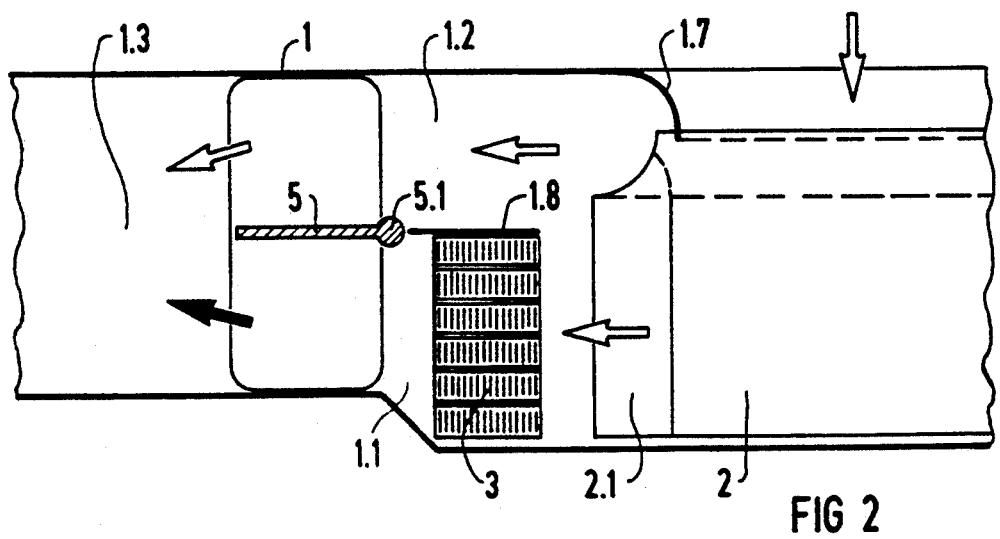
FIG. 2 is a partial section of the unit according to FIG. 1 in the sectional profile II—II illustrating an air-mix flap position for mixed-air operation.

In FIG. 1, all air-flow directions are generally indicated with the same kind of arrows while in FIGS. 2–6, the warm-air flows are indicated with fully darkened arrows and the cold-air flows as are indicated with contoured arrows. The air conditioner for the interior of a motor vehicle depicted in FIGS. 1 through 6 includes a device housing 1 (made of plastic for example) having a full-ring shaped heat exchanger 3 (i.e., closed upon itself over 360°) and a cold-air chamber. A radial air blower 2 is driven by an electromotor 2.2 (FIG. 6) and is enclosed in the cold-air chamber. An evaporator 4 is connected on the intake side of the radial air blower 2 at its ventilator housing hood 1.7 (see FIGS. 2, 5, and 6).

The device housing 1 is axially subdivided into a warm-air-duct disk 1.1 and a cold-air-duct disk 1.2. The fresh air or recirculating air drawn in by the radial air blower 2 from the outside via the evaporator 4 through the ventilator housing hood 1.7 can enter the device housing. It can then be deflected radially such that after emerging from the blade ring 2.1 of the radial air blower 2 in the area of an annular gap 8, the air drawn in can enter with axial deflection both through the full-ring-shaped heat exchanger 3 into the device-housing part forming the warm-air-duct disk 1.1 as well as away from the heat exchanger 3, into the axially adjacent device-housing part forming the cold-air-duct disk 1.2. The warm-air-duct disk 1.1 and the directly axially adjacent cold-air-duct disk 1.2 are insulated and separated from one another by a partition wall 1.8.

A first mixing chamber 1.3 includes a left floor air duct 1.31, a left defrost air duct 1.32, and a left rear seat area air duct 1.33 emerging from it. The first mixing chamber 1.3 is connected at the shortest possible duct distances to the nozzles of a left-side temperature adjustment at a left side of the warm-air-duct disk 1.1 or of the cold-air-duct disk 1.2 extending over the entire circumference. a second mixing chamber 1.4 includes a right floor air duct 1.41, a right defrost air duct 1.42 and a right rear seat area air duct 1.43 emerging from it. The second mixing chamber is simply connected to the nozzles of a right-side temperature adjustment. A median-plane mixing chamber 1.5 is arranged between the first mixing chamber 1.3 and the second mixing chamber 1.4. The median-plane mixing chamber is directly connected to the warm-air-duct disk 1.1, or to the cold-air-duct disk 1.2. From the median-plane mixing chamber 1.5, short-path air ducts lead on the outlet-side to nozzles (e.g., located in the dashboard of the motor vehicle). A first air-mix flap 5 is provided in the first mixing chamber 1.3, a second air-mix flap 6 in the second mixing chamber 1.4, and a median-plane air-mix flap 7 in the median-plane mixing chamber 1.5. Each of the air-mix flaps permit the air-side temperature of the air emerging from the particular mixing chambers to be adjusted.

In a structurally simple and aerodynamically effective way, the air-mix flaps 5, 6, or 7 are pivoted, in each case, at the end of the partition wall 1.8 closest to the respective mixing chamber on axes of rotation 5.1, 6.1, or 7.1, respectively, such that each air-mix flap can swivel to completely close off the warm-air-duct disk, on the one hand, and the cold-air-duct disk, on the other hand, or to any intermediate positions. Therefore, the mixture ratio of the air from the cold-air-duct disk 1.2 warmed by the uncontrolled heat exchanger 3 and the fresh air or circulating air emerging from the cold-air-duct disk 1.2 without being affected by the heat exchanger 3, is based on the prevailing position of the air-mix flaps 5 or 6 or 7.

To supply the rear seat area with unheated fresh or recirculating air, a rear seat area cold-air duct 1.6 is branched off from the cold-air-duct disk 1.2, preferably on the side of the heat exchanger opposing the median-plane mixing chamber.

All of the air ducts emerging from the mixing chambers can be blocked in a manner not depicted in greater detail here by a single air flap at the point of their emergence from the mixing chambers.

The arrangement of the warm-air-duct disk 1.1 and the cold-air-duct disk 1.2 can be interchanged with respect to the direction of travel of the motor vehicle indicated by an arrow between FIG. 5 and FIG. 6 such that the cold-air-duct disk 1.2 may be either arranged in front of the warm-air-duct disk 1.1 (see FIG. 6) or behind the warm-air-duct disk 1.1 (see FIG. 5).

The radial outer edge of the blade ring 2.1 and the radial inner edge of the full-ring shaped heat exchanger are chosen such that the annular gap 8 between the radial outer edge of the blade ring 2.1 of the radial air blower 2 and the radial inner edge of the full-ring-shaped heat exchanger 3 permits some fresh air or cold air flow to be conditioned by the air resistance of the heat exchanger 3 so as to be discharged with axial deflection from the air flow emerging from the blade ring 2.1 into the axially adjacent cold-air-duct disk 1.2. According to one refinement of the present invention, a radial air blower 2 is provided with a blade ring 2.1, which also extends in the area of the cold-air-duct disk 1.2 and thus also directly discharges an air-flow component which does not meet with the resistance of the heat exchanger 3. As a result, this air flow is initially axially deflected into the cold-air-duct disk 1.2.

What is claimed is:

1. An air side temperature adjustment device for controlling the air temperature in a motor vehicle comprising:
   a) a first air duct;
   b) a radial air blower, said radial air blower having an outer radius and including a blade ring drawing air in from said first air duct;
   c) a heat exchanger having a ring shape, said heat exchanger having a common axis with said radial air blower and an inner radius larger than said outer radius of said radial air blower, said ring shaped exchanger being closed upon itself;
   d) a warm-air-duct disk having a ring shape, said warm-air-duct disk having an inlet disposed adjacent to an outer radius of said heat exchanger such that some of the air drawn in by said radial air blower is directed through said heat exchanger before entering said warm-air-duct disk;
   e) a cold-air-duct disk having a ring shape, said cold-air-duct disk accepting some of the air drawn in by said radial air blower;
   f) a floor air duct;
   g) a defrost air duct;
   h) a mixing chamber, said mixing chamber including an air mix flap, wherein said mixing chamber is fluidly coupled with, and accepts air from, said warm-air-duct disk and said cold-air-duct disk in amounts based on a position of said air mix flap, and is fluidly coupled with both said floor air duct and said defrost air duct so that air from said mixing chamber is provided to said floor air duct and said defrost air duct, the temperature of the air emerging from said floor air duct and defrost air duct being based on said position of said air mix flap.

2. The device of claim 1 wherein said first air duct is fluidly coupled with a source of fresh air.

3. The device of claim 1 wherein said first air duct is fluidly coupled with a source of recirculated air.

4. The device of claim 1 further including:
   i) a right floor air duct;
   j) a right defrost air duct; and
   k) a right mixing chamber, including a right air mix flap wherein said right mixing chamber is fluidly coupled with, and accepts air from, said surrounding warm-air-duct disk and said cold-air-duct disk in amounts based on a position of said right air mix flap, and is fluidly coupled with both said right floor air duct and said right defrost air duct so that air from said right mixing chamber is provided to said right floor duct and said right defrost air duct,
   wherein said right mixing chamber is located on a side of a circumference of said radial air blower opposite said mixing chamber.

5. The device of claim 4 further including:
   1) a median plane mixing chamber, said median plane mixing chamber
   i) including a third air mix flap, and
   ii) being fluidly coupled with, and accepting air from, said warm-air-duct disk and said cold-air-duct disk in amounts based on a position of said third air mix flap.

6. The device of claim 5 wherein said median plane mixing chamber is arranged on the circumference of the radial air blower between said mixing chamber and said right mixing chamber.

7. The device of claim 1 further comprising:
   i) a partition wall, separating said warm-air-duct disk and said cold-air-duct disk, and having an end closest to said mixing chamber, disposed directly adjacent to an axis of said air mix flap such that said air mix flap is capable of swiveling about its axis to completely block said warm-air-duct disk and of swiveling about it axis to completely block said cold-air-duct disk.

8. The device according to claim 1 wherein the difference in size between said outer radius of said blade ring and said inner radius of said heat exchanger forms a annular gap through which some of the air drawn in from said first air duct flows into the cold-air-duct disk.

9. The device according to claim 1 further comprising:
   i) a rear seat area air duct, said rear seat area air duct
   i) being fluidly coupled with mixing chamber so that air from said mixing chamber is provided to said rear seat area air duct as well as to said floor air duct and said defrost air duct.

10. The device according to claim 5 further comprising a rear seat area cold-air duct being fluidly coupled with said cold-air-duct disk so that said cold-air-duct disk supplies said rear seat area cold-air duct with cold air.

11. The device according to claim 10 wherein said rear area cold-air duct is arranged on an opposite end of the circumference of the radial air blower as said median-plane mixing chamber.

12. The device according to claim 1 wherein said blade ring extends axially into an area radially inward of said cold-air-duct disk.

* * * * *